United States Patent
Kartheek

(10) Patent No.: US 10,367,724 B1
(45) Date of Patent: Jul. 30, 2019

(54) OPTICAL CHANNEL DATA UNIT (ODU) FAULT PROPAGATION AND LINK RECOVERY USING ODU-DELAY MEASUREMENT

(71) Applicant: Juniper Networks, Inc., Sunnyvale, CA (US)

(72) Inventor: Rathi Kartheek, Cupertino, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 15/835,075

(22) Filed: Dec. 7, 2017

(51) Int. Cl.
- *H04L 12/703* (2013.01)
- *H04L 12/707* (2013.01)
- *H04B 10/80* (2013.01)
- *H04B 10/032* (2013.01)

(52) U.S. Cl.
CPC .......... *H04L 45/28* (2013.01); *H04B 10/032* (2013.01); *H04B 10/80* (2013.01); *H04L 45/22* (2013.01)

(58) Field of Classification Search
CPC ....... H04L 45/28; H04L 45/22; H04B 10/032; H04B 10/80; H04Q 11/0005; H04J 14/0212; H04J 14/0227; H04J 14/0283; H04J 14/02
See application file for complete search history.

(56) References Cited

U.S. PATENT DOCUMENTS

| | | |
|---|---|---|
| 6,647,210 B1 | 11/2003 | Toyoda et al. |
| 6,788,410 B1* | 9/2004 | Otani ........................ G01J 7/00 356/364 |
| 2012/0213508 A1* | 8/2012 | Moynihan ............. H04J 3/0682 398/25 |
| 2013/0195442 A1* | 8/2013 | Murakami ......... H04B 10/0795 398/25 |

* cited by examiner

*Primary Examiner* — Ted M Wang
(74) *Attorney, Agent, or Firm* — Cooley LLP

(57) ABSTRACT

In some embodiments, a system includes a first router and a second router both configured to be included within an OTN. The first router is configured to send to the second router a first signal having an ODU with a path delay measurement (DMp) bit set. The first router is configured to, in response to not receiving within a path-length-dependent time period from the second router a second signal having the DMp bit set, (1) trigger a protection action at the first router, and (2) send to the second router a signal configured to notify the second router to trigger the protection action at the second router. The second router is configured to, in response to receiving the signal configured to notify, trigger the protection action at the second router.

13 Claims, 4 Drawing Sheets

---

Send from a source path terminating node within an optical transport network (OTN) to a destination path terminating node within the OTN, a first signal having an optical data unit (ODU) with a path delay measurement (DMp) bit set — 310

Trigger a protection action at the source path terminating node in response to not receiving within a path-length-dependent time period from the destination path terminating node a second signal having the DMp bit set — 320

Send to the destination path terminating node a signal configured to notify the destination path terminating node to trigger the protection action at the destination path terminating node — 330

OPTICAL CHANNEL DATA UNIT (ODU) FAULT PROPAGATION AND LINK RECOVERY USING ODU-DELAY MEASUREMENT

BACKGROUND

The embodiments described herein relate to systems and methods for analyzing fault detection in an optical transport network (OTN). More particularly, the embodiments described herein relate to devices and methods for optical data unit (ODU) fault propagation and link recovery using ODU-delay measurement.

An optical communication can be implemented using an optical communication network involving multiple network elements that are physically interconnected through optical fiber links. An end-to-end connection (i.e., connection between a source node and a destination node) among network elements for the transmission of optical data signals is referred to as a communication path (or simply 'path'). The optical data signals can be transmitted over the communication path as structured frame units with a predetermined frame rate.

For example, in an OTN, a source node can be connected to a destination node via a communication path involving multiple network elements. To start communication in the OTN, the source node (or source path terminating equipment (PTE)) can generates a data structure referred as an ODU. Before transmission of the ODU, the source node encapsulates the ODU into a structured frame unit referred to as an optical terminal unit (OTU) frame. The source node then transmits the OTU frame over the OTN using the connection path to destination node.

Over the optical communication network, the transmission of OTU frame from source PTE to destination PTE can sometimes undergo signal degradation due to reasons such as a fault in the connection path. In some instances, the occurrence of signal degradation can even lead to loss of the OTU frame, which results in the loss of data over the network. Accordingly, upon determining fault in the connection path of the network, a known method implements re-transmission of OTU frame over the OTN.

Moreover, the fault in the connection path and re-transmission of the OTU frame can sometimes cause delay in the end-to-end communication. Accordingly, a re-transmitted OTU will likely experience signal degradation and/or loss of the related OTU frame as experienced by the previously transmitted OTU frame(s). Thus, such a retransmission technique can negatively impact the efficiency of the OTN.

Some known routers/interfaces support ODU-based bit interleaved parity (BIP) Fast Rerouting (FRR). Such known routers/interfaces determine the signal degrade condition based on the ODU BIP-8 threshold count over a period of time on the ODU layer and when the signal degrade condition occurs, an ODU-based FRR is activated to switch to another protection link. This ODU-based FRR implementation is expensive and as a result not all routers/interfaces support ODU-based BIP FRR.

Thus, a need exists for improved ODU fault propagation and link recovery using ODU-delay measurement.

SUMMARY

In some embodiments, a system includes a first router and a second router both configured to be included within an OTN. The first router is configured to send to the second router a first signal having an ODU with a path delay measurement (DMp) bit set. The first router is configured to, in response to not receiving within a path-length-dependent time period from the second router a second signal having the DMp bit set, (1) trigger a protection action at the first router, and (2) send to the second router a signal configured to notify the second router to trigger the protection action at the second router. The second router is configured to, in response to receiving the signal configured to notify, trigger the protection action at the second router.

DETAILED DESCRIPTION

Figure 1:
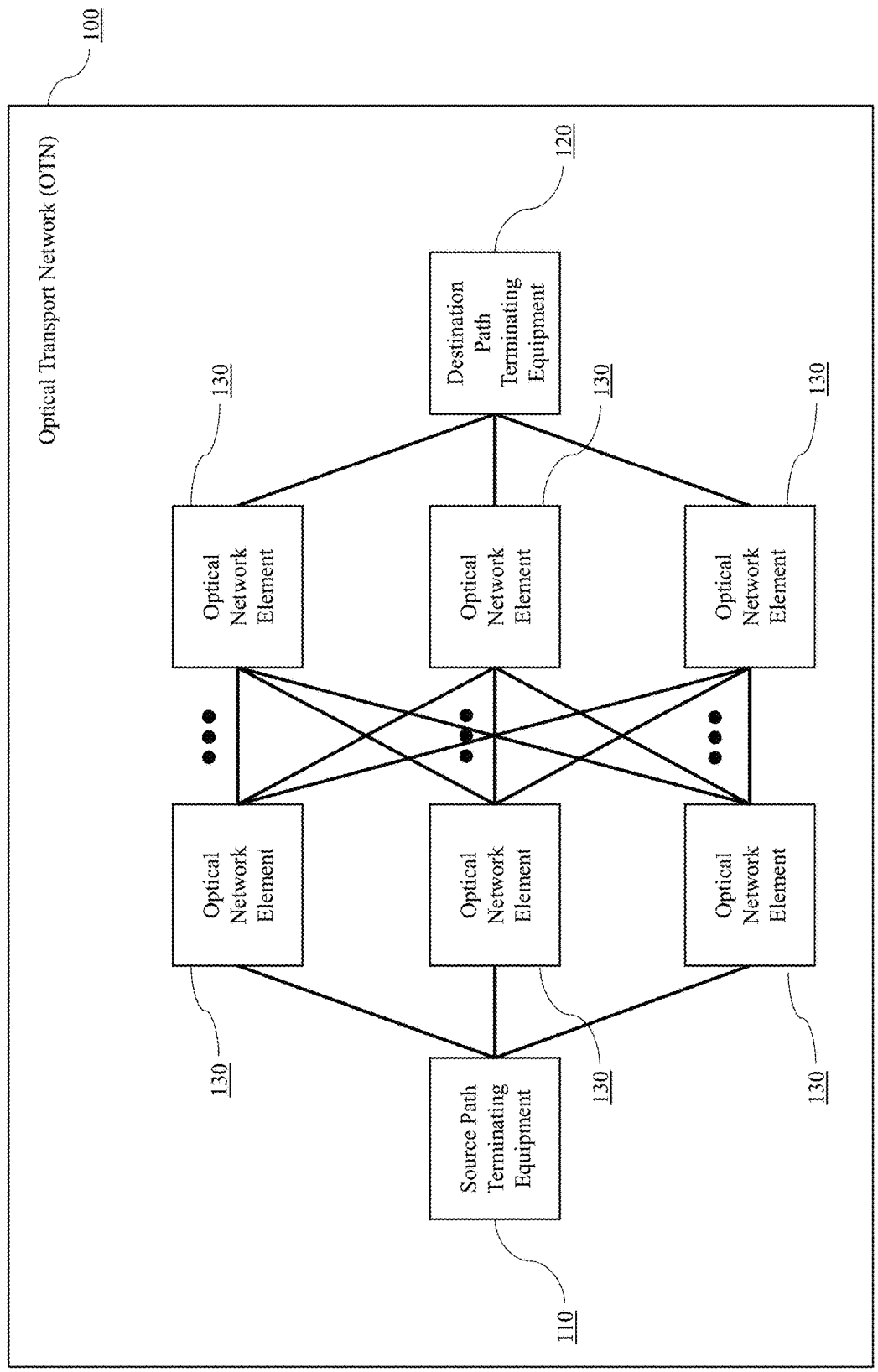
FIG. 1 is a schematic block diagram of an OTN, according to an embodiment.

In some embodiments, a method includes sending from a source path terminating node within an optical transport network (OTN) to a destination path terminating node within the OTN, a first signal having an optical data unit (ODU) with a path delay measurement (DMp) bit set. The method can include in response to not receiving within a path-length-dependent time period from the destination path terminating node a second signal having the DMp bit set, triggering a protection action at the source path terminating node. The method can further include sending to the destination path terminating node a signal configured to notify the destination path terminating node to trigger the protection action at the destination path terminating node.

In some embodiments, a method includes receiving from a source path terminating node within an OTN and at a destination path terminating node within the OTN, a first signal having an ODU with a DMp bit set. The method can include sending, in response to receiving the first signal, a second signal having the DMp bit set to the source path terminating node. The method can include receiving, at the destination path terminating node and from the source path terminating node, a signal configured to notify the destination path terminating node to trigger the protection action at the destination path terminating node, in response to the source path terminating node not receiving within a path-length-dependent time period from the destination path terminating node the second signal having the DMp bit set. The method can further include triggering the protection action at the destination path terminating node in response to receiving the signal configured to notify.

In some embodiments, a system includes a first router and a second router both configured to be included within an OTN. The first router is configured to send to the second router a first signal having an ODU with a DMp bit set. The first router is configured to, in response to not receiving within a path-length-dependent time period from the second router a second signal having the DMp bit set, the first router (1) triggering a protection action at the first router, and (2) sending to the second router a signal configured to notify the second router to trigger the protection action at the second router. The second router is configured to, in response to receiving the signal configured to notify, triggering the protection action at the second router.

As used herein the term "ODU" refers to any Optical Data Unit. An ODU represents, for example, a frame structure organized in an octet-based block frame structure with four rows and 3824 columns and includes optical path-level monitoring, alarm indication signals and/or similar capabilities. For example, ODU has similar functions to the 'Line Overhead' in SONET/SDH. As described further herein, an ODU can also be referred to as an Optical Data Unit-k (ODUk) where k=1, 2 or 3, according to the ITU-T G.709 recommendation (available at http://www.itu.int/rec/T-REC-G.709/en, last updated Sep. 27, 2017), which is incorporated herein by reference.

As used herein the term "OTU" refers to any Optical Transport Unit. An OTU represents, for example, a frame structure organized in an octet-based block frame structure with four rows and 4080 columns. The OTU represents a physical optical port (such as OTU1, OTU2, OTU2e, OTU2f, OTU3, OTU3e2, OTU4 and/or the like), and adds performance monitoring (for the optical layer), FEC (Forward Error Correction) and/or similar capabilities. For example, OTU is similar to the 'Section Overhead' in SONET/SDH. As described further herein, an OUT can also be referred to as an Optical Transport Unit-k (OTUk) where k=1, 2 or 3, according to the ITU-T G.709 recommendation. The ODU described above is a subset frame structure of the OTU. In other words, an ODU frame structure along with a forward error correction (FEC) with four rows and additional 256 columns forms an OTU.

As used herein the term "OPU" refers to any Optical Payload Unit. An OPU represents a frame structure organized in an octet-based block frame structure with four rows and 3810 columns. The OPU contains the encapsulated client data, and a header describing the type of that data. For example, OPU is analogous to the 'Path' layer in SONET/SDH. As described further in the specification, an Optical Payload Unit-k is referred to as OPUk where k=1, 2 and 3, according to ITU-T G.709.

As used herein the term "PTE" refers to any path terminating equipment, which can refer to any optical network device in the OTN. For example, a router, a switch, a hub and/or the like can be a PTE in the OTN. A PTE can also be referred to herein as a path terminating node. In most instances, the PTE functions as a source and/or sink in an end-to-end communication. Further the methods described herein (e.g., FIGS. 3 and 4, and the claims) can be performed by the processors of the PTEs. More specifically, the PTEs can each include a processor and a memory coupled to the processor and storing processor-readable instructions (e.g., software) that implement the portions the one or more of the methods described herein to be performed by a processor and relate to the control of optical components of the PTEs.

FIG. 1 is a schematic block diagram of an optical transport network (OTN) 100, according to an embodiment. The OTN 100 includes a source PTE 110, a destination PTE 120 and optical network elements 130. The source PTE 110, destination PTE 120 and optical network elements 130 are connected by various optical links. The communication flow occurs, for example, between source PTE 110 and destination PTE 120 via one or more optical network elements 130.

The optical network elements 130 described herein generally represent any type or form of computing device capable of facilitating the flow of traffic within the OTN. Examples of optical network elements 130 includes routers, switches, network hubs, nodes, bridges, gateways, combinations of one or more of the same, or any other suitable OTN devices.

In some instances, the OTN can be used to connect two or more client devices such as mobile phone, laptops, tablets, desktops and/or the like. In yet other instances, the OTN can be used to connect other networks for the exchange of data between large and small information systems. For example, OTN can be used as a transport network between two non-optical networks such as a wired communication network(s), a wireless communication network(s), and/or public switched telephone network(s) (PSTN).

The source PTE 110 can be configured to accept client data from a client side equipment (not shown in FIG. 1) and encapsulate the client data in a frame structure. The source PTE 110 can compute and generate the overhead to form the frame structure for the data. The source PTE 110 can initiate communication by transmitting the frame structure to the destination PTE 120 via one or more optical network elements 130 that form (or define) a communication path.

For example, the source PTE 110 can accept data from a client side equipment and can encapsulate the data into an OTU frame. In such an OTU frame, the data will be in the form of an ODU. The source PTE 110 can be configured to map the destination of the data that is to be transmitted to the destination PTE 120 within the OTN 100. The source PTE 110 can be configured to select a communication path to destination PTE 120 via one or more optical network elements 130.

The destination PTE 120 is configured to receive the OTU frame from the optical network element 130. For data processing, the destination PTE 120 can be configured to extract (or decapsulate) the ODU from the OTU frame. In some instances, the destination PTE 120 analyzes the received OTU frame for signal data integrity and also to check for the occurrence of degradation or failure in the communication path. Furthermore, in some instances, the destination PTE 120 can also provide feedback to the source PTE 110.

Figure 2:
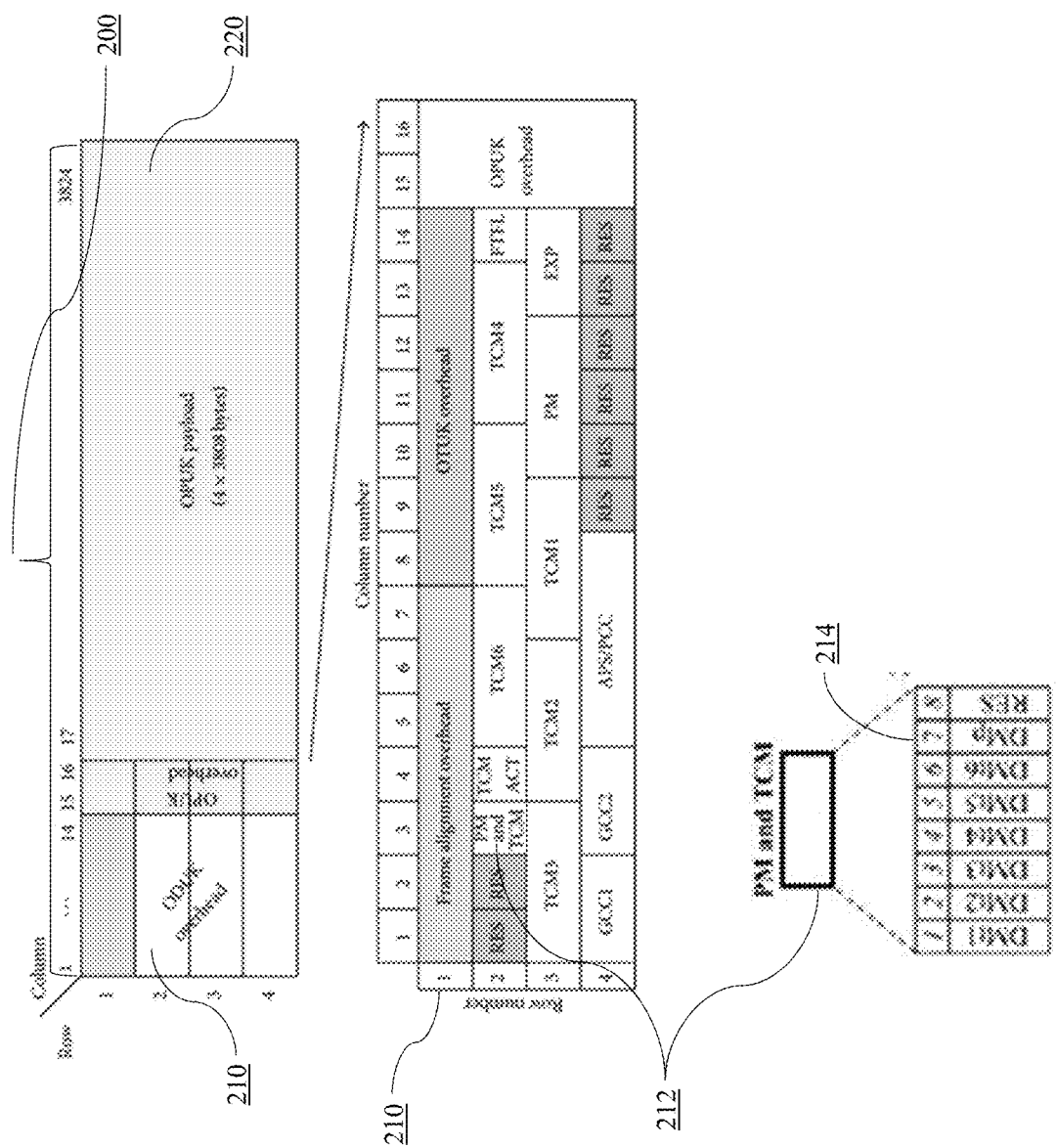
FIG. 2 is a representation of an ODUk frame involving ODUk overhead.

FIG. 2 is a representation of an ODUk frame 200 involving ODUk overhead 210. The ODUk frame 200 includes ODUk overhead 210, an OPUk overhead, and OPUk payload 220. The OPUk payload 220 is a block frame structure comprising of four rows and extending from column 17 to column 3824 (i.e. it has size 4×3808 bytes). The ODUk overhead 210 is a block frame structure having four rows and extending from column 1 to column 14 (i.e. it has size 4×14 bytes).

Below the ODUk frame 200, the FIG. 2 further contains a representation of the byte field of the ODUk overhead 210 and the OPUk overhead. The ODUk overhead 210 frame structure includes contains thirteen defined fields, namely: PM/TCM byte 212 (described in below in detail), TCM/ACT field, TCM1 field, TCM2 field, TCM3 field, TCM4 field, TCM5 field, TCM6 field, PM field, GCC1 field, GCC2 field and APS/PCC field. In the ODUk frame also include some of the bytes fields in row 2 and row 4 are indicated by the term RES, meaning those bytes are reserved bytes. Furthermore, a word (2 bytes) on the row 3 and column 13 and 14 is an experimental word indicated by the EXP.

Below the ODUk overhead 210, FIG. 2 further contains a representation of the bit fields of the PM/TCM 212 byte. The path monitoring/tandem connection monitoring (PM/TCM) 212 byte includes eight bits, one of which is the (DMp) bit 214, which is a path delay measurement bit. The transition in the value of the DMp bit 214 (i.e. from logic '0' to logic '1' and vice versa) is used as an indication to start/stop measuring delay between two PTEs connected by an optical link in an OTN.

In use, for ODUk path monitoring, a one-bit DMp 214 signal is defined to convey the start of the delay measurement test. The DMp signal has a constant value (0 or 1) that is inverted at the beginning of a two-way delay measurement test. The transition from 01 in the sequence 0000011111, or the transition from 10 in the sequence 1111100000 represents the path delay measurement start point. The new value of the DMp signal is maintained until the start of the next delay measurement test. The delay measurement is measured in the number of frames slipped (or delayed) in receiving the delay measurement pattern at the source PTE after sending from the source PTE to the destination PTE connected by an optical link in an OTN. In most instances, the value of the delay measurement between the source PTE and the destination PTE is specific to the optical link (i.e. communication path) in the OTN. If the source PTE and the destination PTE are connected using an alternative optical link, where the alternative optical link is different from the previously connected optical link, then the value of the delay measurement between the source PTE and destination PTE may be different.

For example, to carry out a delay measurement, the source PTE inserts the inverted delay measurement signal DMp into a defined subfield of the ODUk overhead and sends the OTUk frame through the optical link connected to the destination PTE. The destination PTE upon detection of an inversion of the delay measurement signal DMp in the defined subfield, loops back the inverted delay measurement signal towards the source PTE. The source PTE measures the number of frames between the moment the delay measurement signal value is inverted and the moment this inverted delay measurement signal value is received back from the destination PTE. In some instances, the source PTE and the destination PTE can apply a persistency check on the received DMp signal to be tolerant for bit errors emulating the start of delay measurement indication.

As an example, in an OTN, the source PTE initiates the delay test measurement by setting the value of DMp bit as logic '1' in the ODUk overhead and sending the frame through an optical link (i.e. communication path) to the destination PTE. The destination PTE receives the set DMp and loops back to the source PTE. The source PTE upon the reception of the looped back DMp bit, stops the delay measurement test and calculates the expected propagation delay on the optical link. Based on the calculated expected propagation, the source PTE determines whether the optical link (i.e. the communication path) is suitable for continuing further communication. In some instances, the source PTE may trigger a protection action in response to not receiving any response from the destination PTE.

Figure 3:
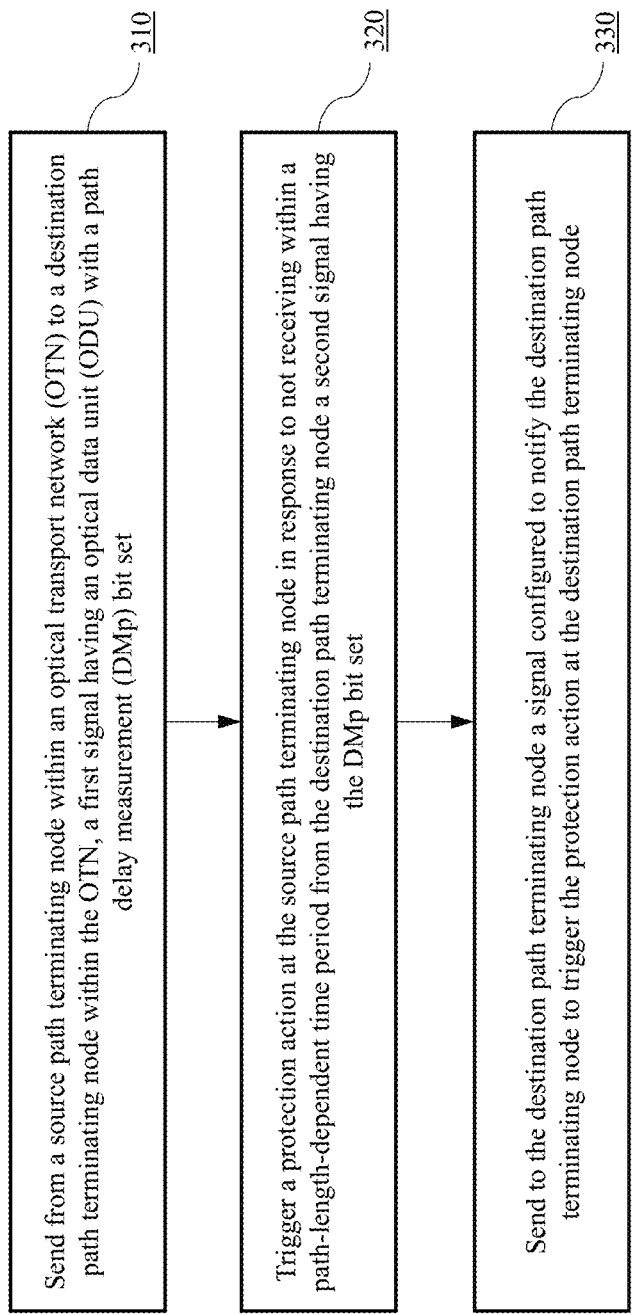
FIG. 3 is a flow chart illustrating a method of triggering protection action from the perspective of the source (originating) path terminating node, according to an embodiment.

FIG. 3 is a flow chart illustrating a method of triggering protection action from the perspective of the source (originating) path terminating node, according to an embodiment. At 310, a source path terminating node within the OTN sends to a destination path terminating node within the OTN, a first signal having an optical data unit (ODU) with a path delay measurement (DMp) bit set. For example, in an OTN, the source PTE can be configured to initiate delay test measurement by setting the value of DMp bit as logic '1' in the ODUk frame overhead and sending the OTUk frame to the destination PTE.

At 320, the source path terminating node triggers a protection action in response to not receiving within a path-length-dependent time period from the destination path terminating node a second signal having the DMp bit set. For example, during the delay measurement, the source PTE can be configured to wait for a response form the destination PTE for a predetermined time period. When the source PTE fails to receive any response from the destination PTE, then the source PTE can be configured to trigger a protection action response. The source PTE can wait for a predetermined time period equal to the path-length-dependent time period, which can be based on an expected propagation time for a signal sent from the source path terminating node to the destination path terminating node and a signal sent the destination path terminating node to the source path terminating node.

In some instances, if the distance is known for a specific optical link (i.e. communication path) connecting the source PTE and the destination PTE, then the expected propagation time can be calculated as path-length-dependent time period. In other instances, the source PTE can be configured to wait for a predetermined time after the source PTE transmits the OTU through the optical link (i.e. communication path) for the destination PTE. The source PTE can wait until it receives a feedback from the destination PTE, and then can calculate the expected propagation time for that optical link. In yet other instances, the source PTE can factor in a tolerance time limit by adding/subtracting time from the calculated expected propagation time. The value of the tolerance time can be less than the calculated expected propagation time.

In case the source PTE does not receive the set DMp bit within a predetermined time period, however, the source PTE assumes that the existing optical link between the source PTE and destination PTE has signal degradation and is not suitable for continuing future communication.

At 330, the source path terminating node sends to the destination path terminating node a signal configured to notify the destination path terminating node to trigger the protection action at the destination path terminating node. For example, the source PTE can send a notification signal to the destination PTE to trigger the protection action at the destination PTE. In some instances, the protection action involves switching to an alternative optical link (i.e., communication path) within the OTN and between the source PTE and destination PTE. In some instances, the protection action is triggered at the source PTE and the signal configured to notify is sent to the destination PTE automatically without intervention from an administrator of the OTN. In yet other instances, the protection action and the sending of notification to the destination PTE can require input(s) from the administrator of the OTN.

In some instances, when the source PTE fails to receive the signal having the DMp set from the destination PTE within a predetermined time period this indicates a signal degradation condition. The signal degradation condition can have been occurred due to (1) a path within the OTN from the source PTE to the destination PTE and/or (2) the path within the OTN from the destination PTE to source PTE.

In some instances, the method of fault propagation detection using DMp bit provides advantages as ODU delay measurement can be enabled by default and works in-service and at the line rate because it does not need any special packets or bandwidth to achieve the fault propagation. In yet other instances, the described method can be implemented on PTEs that fails to include a capability to enable ODU fast reroute (FRR). In some other instances, the described method can be implemented on PTEs that may include a capability to enable ODU fast reroute (FRR).

Figure 4:
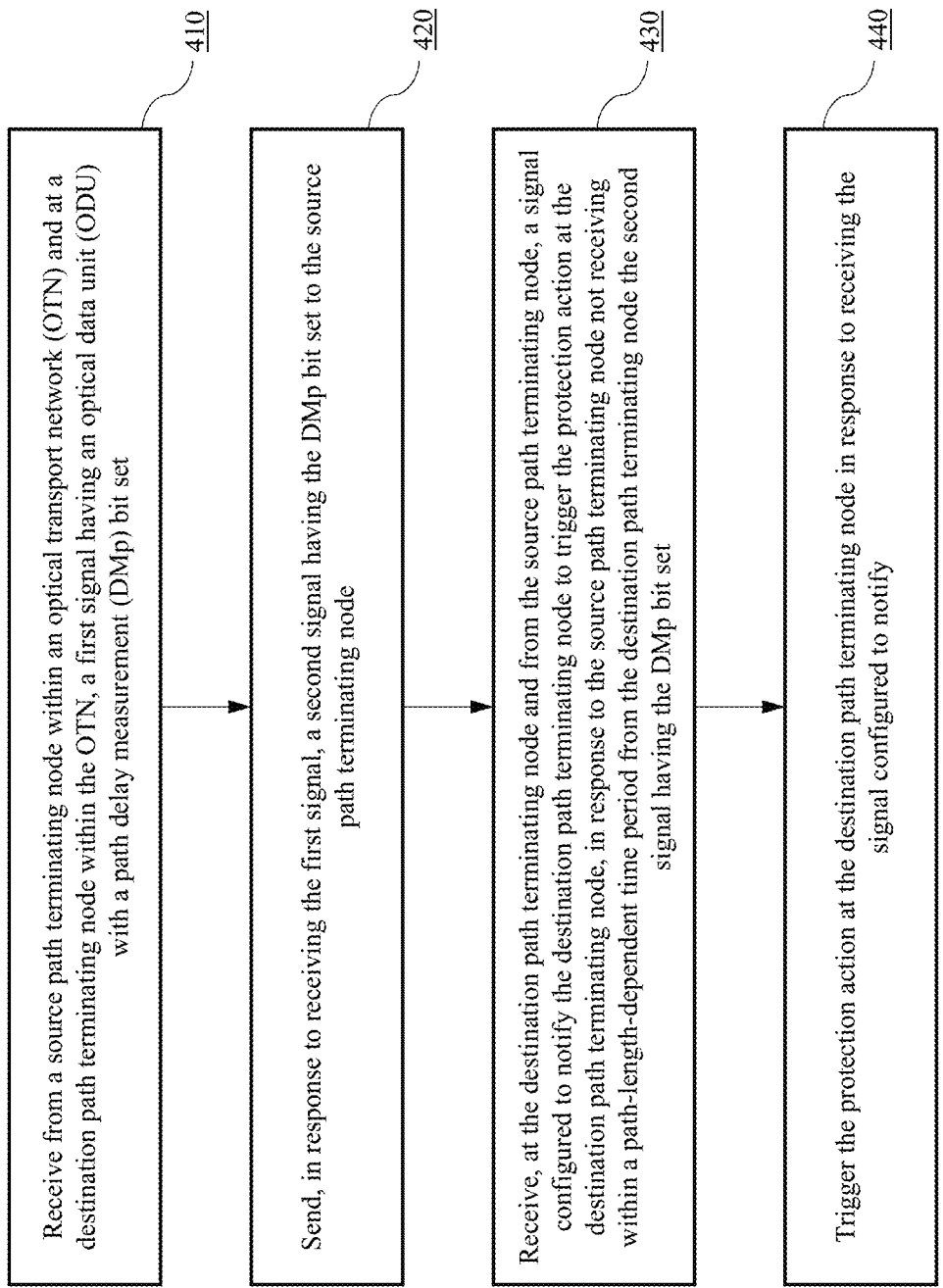
FIG. 4 is a flow chart illustrating a method of triggering protection action from the perspective of the destination (sink) path terminating node, according to an embodiment.

FIG. 4 is a flow chart illustrating a method of triggering protection action from the perspective of the destination (sink) path terminating node, according to an embodiment. At 410, the destination path terminating node receives from a source path terminating node within an optical transport network (OTN), a first signal having an optical data unit (ODU) with a path delay measurement (DMp) bit set. For example, in the OTN, destination PTE can be configured to receive from a source PTE an ODUk frame having an OOUK signal with the DMp bit set.

At 420, the destination path terminating node sends, in response to receiving the first signal, a second signal having the DMp bit set to the source path terminating node. For example, upon the reception of DMp bit set, the destination PTE is configured to loop back the DMp signal towards the source PTE. In other words the second signal sent from the destination path terminating node to the source path terminating node can be a loop back of the first signal or a new signal that is a duplicate of the first signal.

At 430, the destination path terminating node receives from the source path terminating node, a signal configured to notify the destination path terminating node to trigger the protection action at the destination path terminating node, in response to the source path terminating node not receiving within a path-length-dependent time period from the destination path terminating node the second signal having the DMp bit set.

The source PTE can wait for a predetermined time period equal to the path-length-dependent time period. The path-length-dependent time period can be based on an expected propagation time for a signal sent from the source path terminating node to the destination path terminating node and a signal sent the destination path terminating node to the source path terminating node. The expected propagation time can be determined using the instances described above.

For example, the destination PTE is configured to receive from the source PTE, a signal configured to notify the destination PTE to trigger the protection action at the destination PTE, in response to the source PTE not receiving the second signal having the DMp bit set within a path-length-dependent time period from the destination PTE.

At 440, the destination path terminating node triggers the protection action at the destination path terminating node in response to receiving the signal configured to notify. For example, the destination PTE triggers the protection action at the destination PTE in response to receiving the notification signal.

In some instances, the protection action that may involve switching to an alternative optical link within the OTN to establish communication with the source PTE. In some instances, the protection action is triggered at the destination path terminating node automatically without intervention from an administrator of the OTN. In yet other instances, the protection action at the destination PTE can require input(s) from the administrator of the OTN. In some instances, receiving the signal configured to notify from the destination path terminating node indicates a signal degradation condition in a path within the OTN from the destination path terminating node to the source path terminating node.

In some instances, the method of fault propagation detection using DMp bit provides advantages as ODU delay measurement can be enabled by default and works in-service and at the line rate because it does not need any special packets or bandwidth to achieve the fault propagation. In yet other instances, the described method can be implemented on PTEs that fails to include a capability to enable ODU fast reroute (FRR). In some other instances, the described method can be implemented on PTEs that may include a capability to enable ODU fast reroute (FRR).

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A method, comprising:
   sending from a source path terminating node within an optical transport network (OTN) to a destination path terminating node within the OTN, a first signal having an optical data unit (ODU) with a path delay measurement (DMp) bit set;
   in response to not receiving within a path-length-dependent time period from the destination path terminating node a second signal having the DMp bit set, triggering a protection action at the source path terminating node; and
   sending to the destination path terminating node a signal configured to notify the destination path terminating node to trigger the protection action at the destination path terminating node.

2. The method of claim 1, wherein the protection action is switching to an alternative optical link within the OTN and between the source path terminating node and the destination path terminating node.

3. The method of claim 1, wherein the source path terminating node and the destination path terminating node each fails to include a capability to enable ODU fast reroute (FRR).

4. The method of claim 1, wherein the source path terminating node is a router configured as a first path terminating equipment (PTE) within the OTN, the destination path terminating node is a router configured as a second path terminating equipment (PTE) within the OTN.

5. The method of claim 1, wherein the path-length-dependent time period is based on an expected propagation time for a signal sent from the source path terminating node to the destination path terminating node and a signal sent the destination path terminating node to the source path terminating node.

6. The method of claim 1, wherein the protection action is triggered at the source path terminating node and the signal configured to notify is sent to the destination path terminating node automatically without intervention from an administrator of the OTN.

7. The method of claim 1, wherein not receiving the signal having the DMp bit set from the destination path terminating node within the path-length-dependent time period indicates a signal degradation condition in at least one of (1) a path within the OTN from the source path terminating node to the destination path terminating node or (2) a path within the OTN from the destination path terminating node to the source path terminating node.

8. A system, comprising:
   a first router configured to be included within an optical transport network (OTN); and
   a second router configured to be included within the OTN,
   the first router configured to send to the second router a first signal having an optical data unit (ODU) with a path delay measurement (DMp) bit set,
   in response to not receiving within a path-length-dependent time period from the second router a second signal having the DMp bit set, the first router (1) triggering a protection action at the first router, and (2) sending to the second router a signal configured to notify the second router to trigger the protection action at the second router
   in response to receiving the signal configured to notify, the second router triggering the protection action at the second router.

9. The system of claim 8, wherein the protection action is switching to an alternative optical link within the OTN and between the first router and the second router.

10. The system of claim 8, wherein the first router and the second router each fails to include a capability to enable ODU fast reroute (FRR).

11. The system of claim 8, wherein the path-length-dependent time period is based on an expected propagation time for a signal sent from the first router to the second router and a signal sent the second router to the first router.

12. The system of claim 8, wherein the protection action is triggered at the first router and triggered at the second router automatically without intervention from an administrator of the OTN.

13. The system of claim 8, wherein not receiving the signal having the DMp bit set from the second router within the path-length-dependent time period indicates a signal degradation condition in at least one of (1) a path within the OTN from the first router to the second router or (2) a path within the OTN from the second router to the first router.

* * * * *